United States Patent
Raynaud et al.

(10) Patent No.: US 9,842,272 B2
(45) Date of Patent: *Dec. 12, 2017

(54) DETECTING THE LOCATION OF A MOBILE DEVICE BASED ON SEMANTIC INDICATORS

(71) Applicant: Google Inc., Mountain View, CA (US)

(72) Inventors: Daniel Raynaud, Cupertino, CA (US); Boris Bluntschli, Zurich (CH); Daniel Cotting, Islisberg (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,304

(22) Filed: Nov. 16, 2016

(65) Prior Publication Data

US 2017/0061606 A1    Mar. 2, 2017

Related U.S. Application Data

(63) Continuation of application No. 14/664,099, filed on Mar. 20, 2015, now Pat. No. 9,524,435.

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00624* (2013.01); *G06K 9/00671* (2013.01);
(Continued)

(58) Field of Classification Search
None
See application file for complete search history.

(56) References Cited

U.S. PATENT DOCUMENTS 8,379,053 B1    2/2013    Phillips et al.
8,606,293 B2    12/2013    Kim et al.
(Continued)

FOREIGN PATENT DOCUMENTS

EP    2312462 A1    4/2011

OTHER PUBLICATIONS

Chon et al., "Autonomous place naming system using opportunistic crowdsensing and knowledge from crowdsourcing", ISPN 2013.*
(Continued)

*Primary Examiner* — Soo Park
(74) *Attorney, Agent, or Firm* — Lerner, David, Littenberg, Krumholz & Mentlik, LLP (57) ABSTRACT

A system and computer implemented method for detecting the location of a mobile device using semantic indicators is provided. The method includes receiving, using one or more processors, a plurality of images captured by a mobile device at an area. The area is associated with a set of candidate locations. Using the one or more processors, one or more feature indicators associated with the plurality of images are detected. These feature indicators include semantic features related to the area. The semantic features are compared with a plurality of stored location features for the set of candidate locations. In accordance with the comparison, a location from the set of candidate locations is selected to identify an estimated position of the mobile device.

20 Claims, 9 Drawing Sheets

(51) Int. Cl.
*G06K 9/62* (2006.01)
*G06T 7/00* (2017.01)
(52) U.S. Cl.
CPC ............ *G06K 9/6202* (2013.01); *G06T 7/004* (2013.01); *G06K 2209/25* (2013.01)

(56) References Cited

U.S. PATENT DOCUMENTS

| | | |
|---|---|---|
| 8,625,854 B2 | 1/2014 | Valkenburg et al. |
| 8,660,581 B2 | 2/2014 | Davis et al. |
| 8,744,418 B2 | 6/2014 | Novet |
| 9,020,191 B2 | 4/2015 | Gupta et al. |
| 9,215,685 B2 | 12/2015 | Gupta et al. |
| 9,367,811 B2 | 6/2016 | Ramachandran et al. |
| 2008/0077583 A1 | 3/2008 | Castro et al. |
| 2009/0122144 A1 | 5/2009 | Latham et al. |
| 2010/0005045 A1 | 1/2010 | Hiraoka et al. |
| 2010/0115462 A1 | 5/2010 | Spencer et al. |
| 2012/0183172 A1 | 7/2012 | Stroila |
| 2013/0045751 A1 | 2/2013 | Chao et al. |
| 2013/0166193 A1 | 6/2013 | Goldman et al. |
| 2013/0328921 A1 | 12/2013 | Kuppusamy |
| 2014/0176677 A1 | 6/2014 | Valkenburg et al. |
| 2015/0281910 A1 | 10/2015 | Choudhury et al. |
| 2016/0003972 A1 | 1/2016 | Angermann et al. |

OTHER PUBLICATIONS

Song et al., "Semantic features for food image recognition with geo-constraints", 2014 ICDMW, Dec. 14, 2014.

Azizyan et al., "SurroundSense: mobile phoine localization via ambience fingerprinting", MobiCom 2009.

Ofstad et al., "AAMPL: accelerometer augmented mobile phone localization", MELT 2008.

Zhang et al., "Identifying logical location via GPS-enabled mobile phone and wearable camera", International Journal of Pattern Recognition and Artificial Intelligence, vol. 26, No. 8, 2012.

Chon et al., "Automatically characterizing places with opportunistic crowdsensing using smartphones", UbiComp 2012.

Cheng et al., "SensOrchestra: Collaborative Sensing for Symbolic Location Recognition", MOBICASE 2010, LNICST 76, pp. 195-210, 2012.

Beijbom Oscar et al: "Menu-Match: Restaurant-Specific Food Logging from Images", 2015 IEEE Winter Conference on Applications of Computer Vision, IEEE, Jan. 5, 2015, pp. 844-851, XP032738297, DOI: 1 0.11 09/WACV.2015. 117.

Selina Chu et al: "Content Analysis for Acoustic Environment Classification in Mobile Robots," AAAI Fall Symposium, Aurally Informed Performance: Integrating Machine Listening and Auditory Presentation in Robotic Systems, Jan. 1, 2006, XP055279763, Retrieved from the Internet on Jun. 10, 2016: URL: http://sail.usc.edu/aigaion2/index.php/attachments/single/197.

International Search Report and Written Opinion dated Jun. 17, 2016, for PCT Application No. PCT/US2016/021780.

Chon et al. ("Autonomous place naming system using opportunistic crowdsensing and knowledge from crowdsourcing"), IPSN 2013.

Mazilu et al. ("Low-power ambient sensing in smartphones for continuous semantic localization"), Aml 2013, LNCS 8309m pp. 166-181, 2013.

\* cited by examiner

DETECTING THE LOCATION OF A MOBILE DEVICE BASED ON SEMANTIC INDICATORS

CROSS-REFERENCE TO RELATED APPLICATIONS

This application is a continuation of U.S. application Ser. No. 14/664,099, filed on Mar. 20, 2015, the disclosure of which is incorporated herein by reference.

BACKGROUND

Modern mobile devices are equipped with location-based features. These devices use signals from Global Positioning Service (GPS) satellites to identify a location, determine a direction of motion, and other functions. Typically, in locations where the GPS satellite signals are weak (e.g., indoors) GPS may not function well or at all. To provide indoor navigation, some devices may use other information such as wireless network signals (WiFi), Bluetooth signals, cellular, compass data, and accelerometer data as well as existing floor plans and pre-generated databases or indices of measurement. However, in certain situations, it may be difficult to ascertain the location of the mobile device, such as in high density commercial areas where there are a lot of internal locations for the device to be located within.

BRIEF SUMMARY

Aspects of the disclosure may be advantageous for providing a computer implemented method of detecting the location of a mobile device based on captured semantic indicators. In one example, the method includes receiving, using one or more processors, a plurality of images captured by a mobile device at an area, the area being associated with a set of candidate locations. The one or more processors are further used to detect one or more feature indicators associated with the plurality of images, the feature indicators including semantic features related to the area, and compare the semantic features with a plurality of stored location features for the set of candidate locations. A location is selected, using the one or more processors, from the set of candidate locations according to the comparison to identify an estimated position of the mobile device. In one example, position information associated with the mobile device overlaps with position information associated with the plurality of stored location features for the set of candidate locations. In some examples, the comparing further includes determining whether the semantic features correspond to stored location features for a given location in the set. Such semantic features may include visual features of a food image and the selected location is associated with a menu corresponding to the food image, audio data of one or more objects at the selected location, a logo associated with the selected location, a time of day and the selected location is associated with a business open at that time of day, textures of objects located within the selected location, sensor data associated with the plurality of images and the sensor data is captured by the mobile device, etc.

The disclosure further provides a non-transitory computer readable medium storing instructions that, when executed by one or more processors, cause the one or more processors to perform a method. Such method includes receiving a plurality of images captured by a mobile device at an area, the area being associated with a set of candidate locations, detecting one or more feature indicators associated with the plurality of images, the feature indicators including semantic features related to the area, comparing the semantic features with a plurality of stored location features for the set of candidate locations, and selecting a location from the set of candidate locations according to the comparison to identify an estimated position of the mobile device.

The disclosure further provides a system comprising a memory storing a plurality of location features for a set of candidate locations, and one or more processors in communication with the memory. The one or more processors are configured to receive a plurality of images captured by a mobile device at an area, the area being associated with a set of candidate locations, detect one or more feature indicators associated with the plurality of images, the feature indicators including semantic features related to the area, compare the semantic features with a plurality of location features stored in memory, and select a location from the set of candidate locations according to the comparison to identify an estimated position of the mobile device.

DETAILED DESCRIPTION

The present disclosure generally relates to techniques for detecting a location of a mobile computing device based on certain semantic indicators captured by the device. The techniques described herein may be useful in collecting semantic indicators as well as other type of attributes associated with a certain area and inferring a particular location within the area that indicates where the semantic indicators were collected. In some embodiments, a system may be provided that can analyze image pixels, audio data, as well as other captured information from still and/or video images in order to detect semantics features that can be used to determine the location of a mobile device.

To determine the location of the user device, the system may detect or otherwise extract the one or more feature indicators associated with a plurality of images captured by the user device. These feature indicators may include semantic features related to a certain location at a particular area, such as the location of a store inside of a shopping mall. The semantic features are compared to a plurality of stored location features for a set of candidate locations known to be within range of the particular area. In accordance with the comparison, a location is selected from the set of candidate locations within range of the particular area to identify an estimated position of the mobile device.

In one illustrative example, a user device may "check-in" to a social networking site by using a food image taken at a restaurant. In this example, the system may detect the type of food in the photo in order to determine that the user device is at a particular type of restaurant in the area which serves this type of food. In response to receiving the food image as well as other kinds of feature indicators, the system may compare these feature indicators to indicators associated with different food images stored in a database. For example, the stored food images may be retrieved from different food menus for various restaurants. A match to a particular location may be determined when a number of matching features between the detected indicators and the stored indicators meet a predetermined threshold level.

Turning to a second example, the user device may capture a video inside of a location. Based on the detected feature indicators related to the type of sounds of various objects in the video, such the sound of an espresso machine or loud music, the system may estimate that device is in a particular café. In some embodiments, a timestamp may be captured indicating a time when the video was taken. Based on this additional semantic information, the system may further determine that the device is at a particular café open at that time.

In other examples, the system may detect other kinds of feature indicators to determine the location of the user device, such as detecting textures of objects in the images, or detecting logos of a particular business, school/university, or other type of organizations associated with a specific location. For example, the textures may include bright colors or unique color patterns. Still further, many other types of feature indicators may be captured along with the images (for example, by sensors associated with the mobile device) and used to further narrow down the position of the user device. Examples of such other feature indicators include motion detection indicators (e.g., indicating people walking by), barometric indicators, humidity indicators, radiation indicators, etc.

For situations in which the subject matter described herein collects information about users, or may make use of user-related information, the users may be provided with an opportunity to control whether programs or features collect user information (e.g., information about a user's social network, social actions or activities, profession, preferences or a user's current location), or to control whether and/or how to receive information that may be of interest to the user. In addition, certain data may be treated in one or more ways before it is stored or used, so that personally identifiable information is removed. For example, a user's identity may be treated so that no personally identifiable information can be determined for the user, or a user's current and historical location may be generalized where location information is obtained (such as to a city, ZIP code or state level), so that a particular location of a user cannot be determined A user may also be provided with the opportunity to decide whether, and to control how, such information (such as pictures and location history) is used and stored on a user's device and by servers with which the device communicates.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
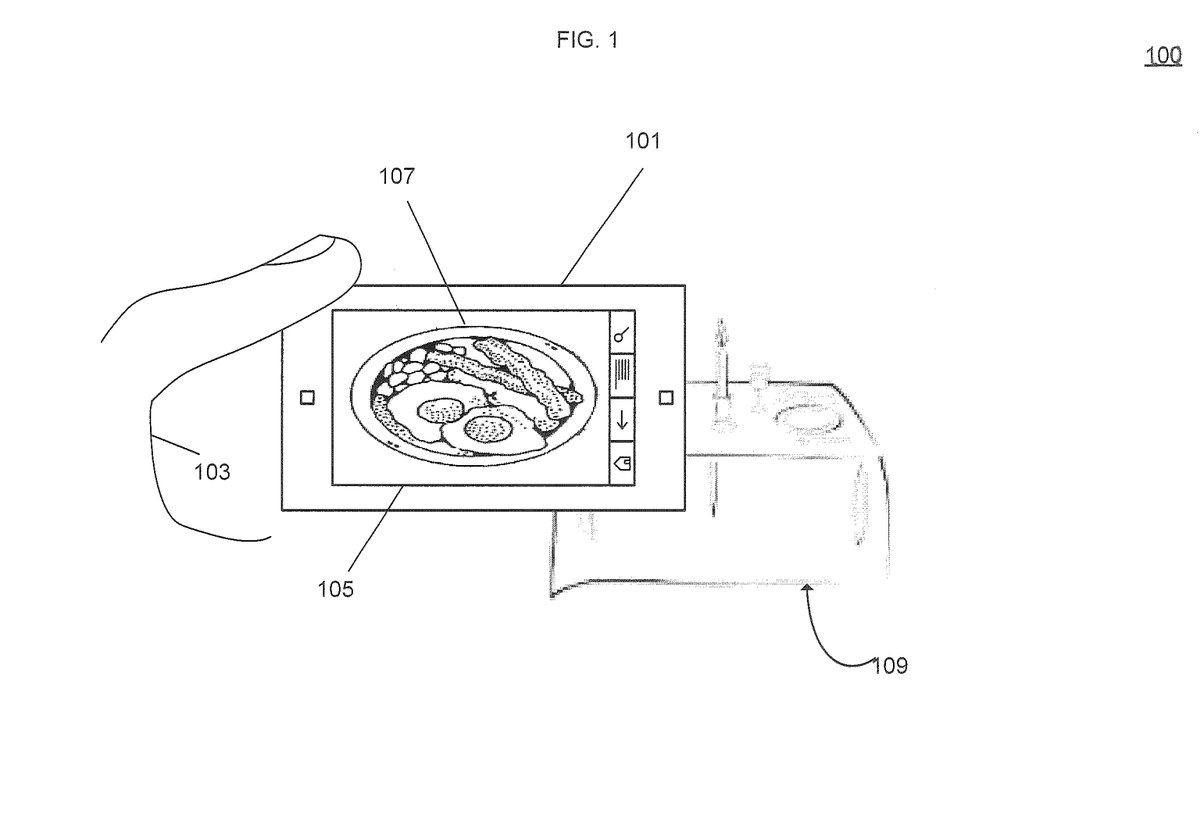
FIG. 1 is an image capture process in accordance with aspects of the disclosure.

FIG. 1 is an image capture process 100. For example, a user 103 may activate a camera associated with a mobile computing device 101, such as a mobile phone, for capturing images at different locations. In this regard, the mobile computing device 101 may include a camera (not shown) for capturing an image 105 taken at certain location. A typical captured image, such as image 105, may include features of objects present at the location when the images were taken. For example, as shown in FIG. 1, image 105 includes features associated with a food image 107 that may have been taken at a particular restaurant 109. Along with the food image 107 certain types of metadata may be captured by the mobile computing device 101. For example, this metadata may include data from sensors, such as an accelerometer, gyroscope, motion and audio sensors or other types of sensors of the mobile computing device 101, and stored in the memory of the device 101 as well as with the captured images.

Once the camera has captured the image information (e.g., images and other metadata), this information may be stored locally at the mobile computing device 101 and/or transmitted to a server. In some aspects, user 103 may utilize an application associated with the mobile computing device 101 for uploading images to a social media web site or an image hosting service. In some embodiments, the user may have to install the application and/or select a service in order to obtain the benefits of the techniques described herein.

The application may be downloaded onto mobile computing device 101. For example, the user 103 may elect to download the application from a service associated with an online server. The mobile computing device 101 may transmit a request for the application over a network and in response, receive the application from the service. The application may be installed locally at the mobile computing device 101. Alternatively, the application can be stored at the service and may be accessed through the mobile computing device 101, for example, via a mobile web browser. By using the application, user 103 may keep the image information private, or publically post or otherwise share images online. In some embodiments, semantic indicators associated with the image information can be used to estimate a certain location of the mobile device 101 relatively near to where the images were captured.

Figure 2A:
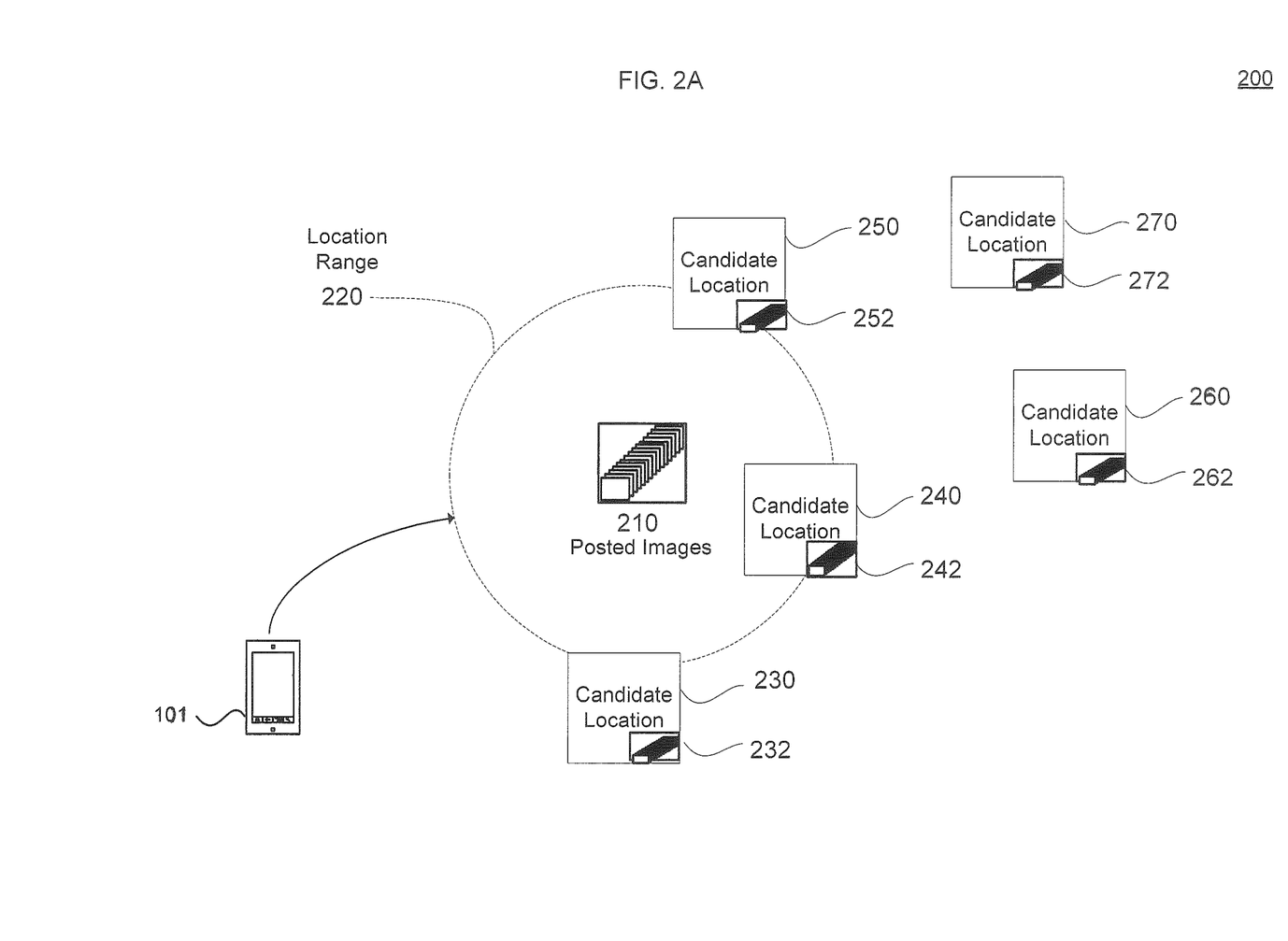
FIG. 2A is a diagram of an area including a number of candidate locations in accordance with aspects of the disclosure.

FIG. 2A is a diagram of an area 200 including a number of candidate locations 230-270. In some examples, the mobile computing device 101 may include geographic positioning features (not shown) that may indicate the user was in a certain area at a particular time when images 210 were captured. For example, the user may have parked their car in the area 200 sometime before taking images 210. Once an initial location is identified, the mobile computing device 101 may store this area information. For example, the area information can be stored at set time intervals (e.g., every 30 seconds) or on demand by the user. The area location information may include one or more data fields, which include positioning information such as a global coordinate (e.g., latitude/longitude) and a timestamp indicating a time when the user of device 101 was at that coordinate.

To estimate an actual location of the mobile computing device 101 in the area 200, several blocks of potential candidate locations 230-270 may be selected. For example, a system may identify a number of candidate locations located in the area 200. In this example, system may use additional information to refine the selection of viable candidate locations. For example, the system may select a subset of candidate locations that are within a predetermined range, such as location range 220. In this example, the system may select candidate locations 230-250 as possible locations of the mobile device 101 when posted images 210 associated with these candidate locations are within location range 220. This may be determined by comparing location data stored with the mobile computing device 101 with coordinates of the candidate locations 230-270 for any overlap. In this regard, the predetermined range may be expressed in a unit of measurement, such as feet, meters, inches, miles, etc., that is within reach of the mobile computing device 101.

Each block of candidate locations 230-270 may be associated with a particular set of stored location features 232-272 that are related to objects at the respective candidate locations 230-270. In some example, the system may compare semantic features from the posted images 210 with the stored location features 232-272 in order to find a closest matching candidate location. For example, a match to a particular candidate location may be determined when a number of matching semantic features between the posted images 210 and the stored location features 232-272 meet a predetermined threshold level. Further aspects of this system are discussed below with respect to FIG. 2B.

Figure 2B:
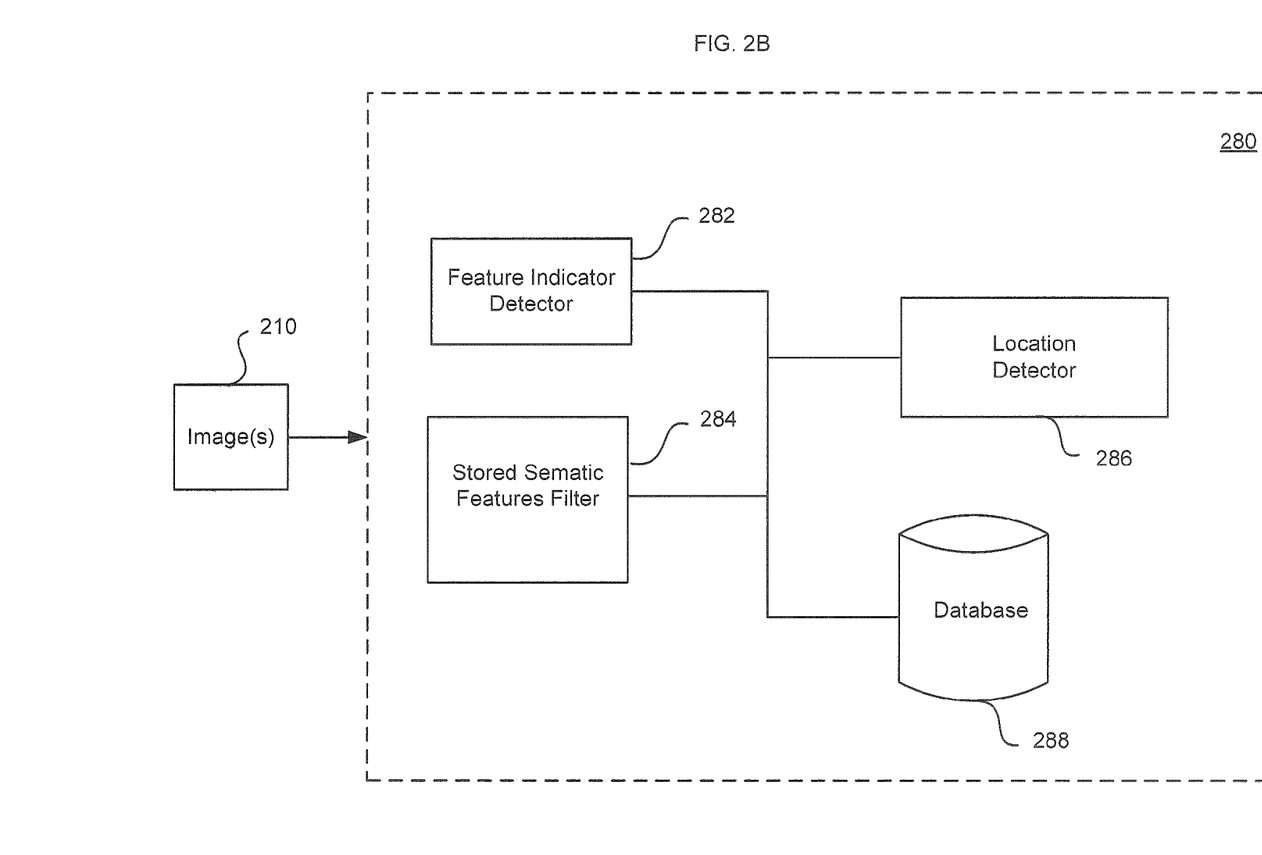
FIG. 2B illustrates an image processing system in accordance with aspects of the disclosure.

FIG. 2B illustrates an image processing system 280 for receiving a number of images 210, analyzing the imagery for semantic feature information and detecting a particular location depicted in the images 210. As shown, the system 280 may have a number of modules to identify location features associated with the images 210 and compare those features with stored semantic features of several candidate locations. For example, the modules may include a feature indicator detector 282 to identify location features associated with an input image and a stored semantic features filter 284 to compare features associated with a set of candidate locations to the location features. In some examples, other modules (not shown) may also be employed.

The modules may employ different techniques for analyzing images. For instance, the location feature detector 282 may include software for analyzing pixels of objects depicted in an image. The modules are shown as being connected to one or more database 288. This database may store semantic features associated with a location that may correspond to where the images 210 were captured. These modules may operate in series or parallel fashion. Another module 286 of system 280 may use the results of other modules 282 and 284, for example, to detect the location associated with image 210.

Figure 3:
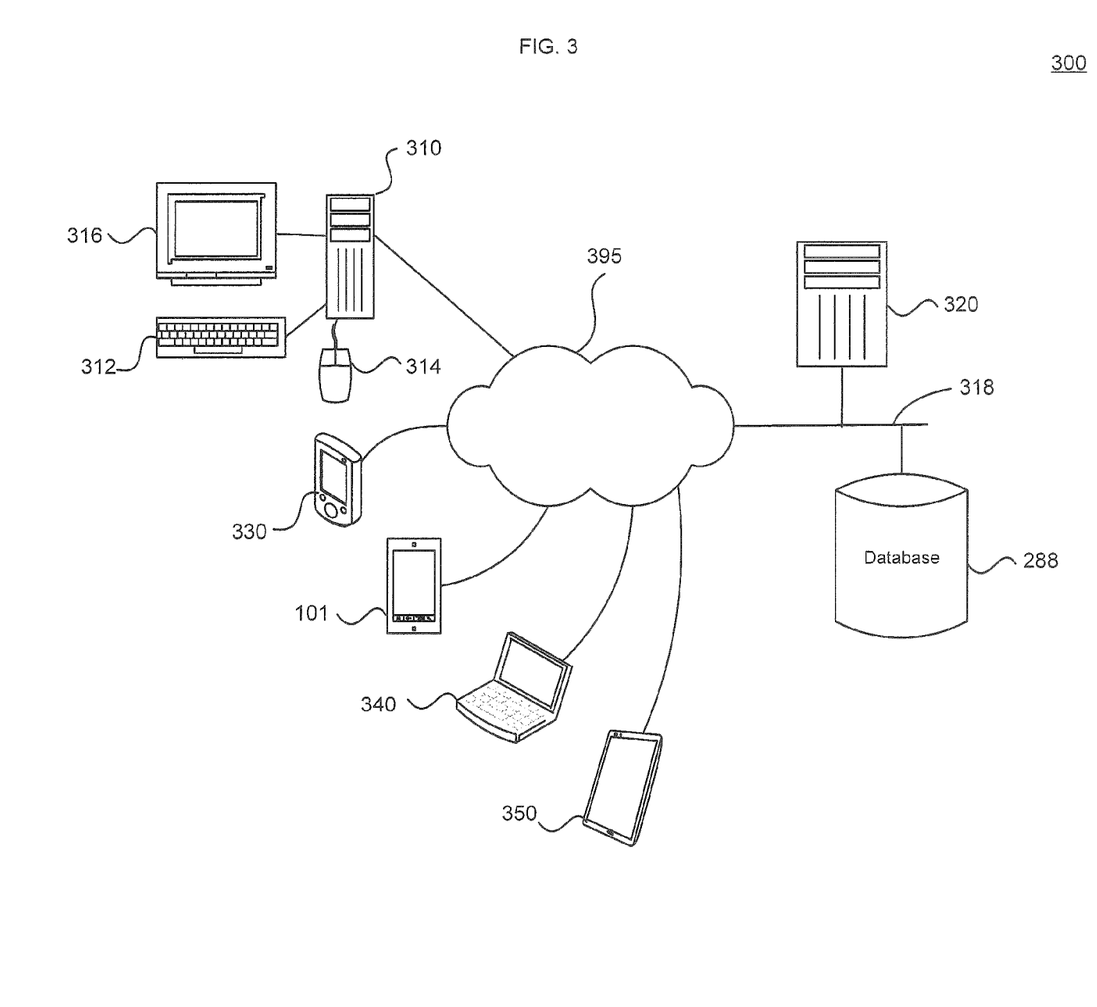
FIG. 3 is an example of a system in accordance with aspects of the disclosure.

FIG. 3 is an example of a system 300 including computing devices for performing aspects of the present disclosure. As shown, system 300 depicts various computing devices that can be used alone or in a networked configuration. For example, this figure illustrates a computer network 395 having a plurality of computers 310 and 320 as well as other types of mobile devices like mobile computing device 101 from FIG. 1, a PDA 330, laptop/netbook 340 and tablet computing device 350. These various devices may be interconnected via a local bus or direct connection 318 and/or may be coupled via a communications network 395 such as a LAN, WAN, the Internet, etc. and which may be wired or wireless.

Each computing device may include, for example, user input devices such as a keyboard 312 and mouse 314 and/or various other types of input devices such as pen-inputs, joysticks, buttons, touch screens, etc., as well as a display 316, which could include, for instance, a CRT, LCD, plasma screen monitor, TV, projector, etc. Each computer 310 and 320 may be a personal computer, application server, etc. By way of example only, computer 310 may be a personal computer while computer 320 may be a server. Databases, such as database 288, are accessible to one or more of the servers or other devices of system 300.

Figure 4:
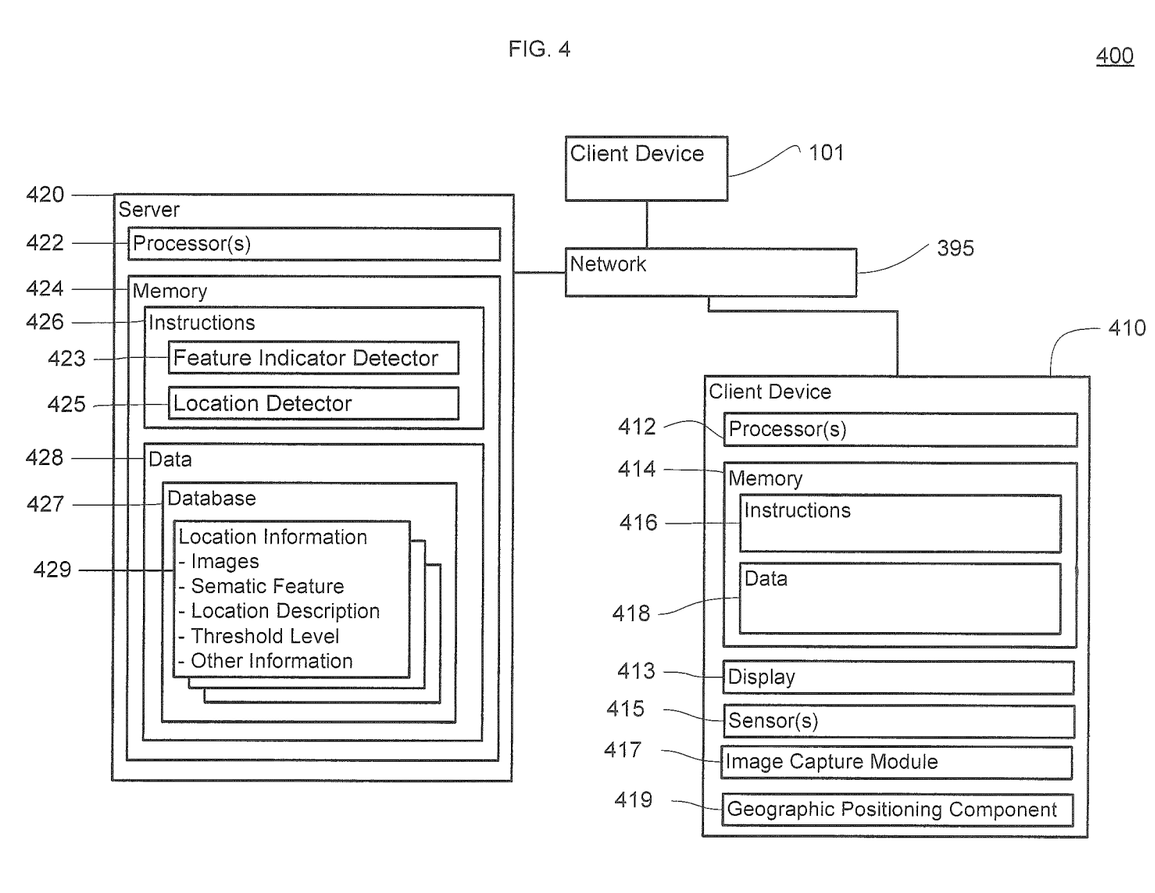
FIG. 4 is another example of a system in accordance with aspects of the disclosure.

FIG. 4 is another example of a system 400, which may be used to detect the location of a mobile device based on captured semantic indicators as described herein. As shown, the system 400 includes a number of client devices, such as client devices 101 and 410, capable of communicating with a server 420 over network 395. The server 420 may include one or more processors 422, memory 424, and other components typically present in general purpose computers.

Memory 424 of server 420 may store information that is accessible by the processors 422, including instructions 426 that may be executed by the processors 422, and data 428. The memory 424 may be of a type of memory operative to store information accessible by the processors 422, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 426 and data 428 are stored on different types of media.

Although FIG. 4 functionally illustrates the processors 422 and memory 424 as being within the same block, the processors 422 and memory 424 may actually include multiple processors and memories that may or may not be stored within the same physical housing. For example, some of the instructions 426 and data 428 may be stored on removable CD-ROM and others within a read only computer chip. Some or all of the instructions and data may be stored in a location physically remote from, yet still accessible by, the processors 422. Similarly, the processors 422 may actually comprise a collection of processors, which may or may not operate in parallel.

Data 428 may be retrieved, stored or modified by processors 422 in accordance with the instructions 426. For instance, although the present disclosure is not limited by a particular data structure, the data 428 may be stored in computer registers, in a relational database as a table having a plurality of different fields and records, XML documents, or flat files. The data 428 may also be formatted in a computer-readable format such as, but not limited to, binary values, ASCII or Unicode. By further way of example only, the data 428 may be stored as bitmaps comprised of pixels that are stored in compressed or uncompressed, or various image formats (e.g., JPEG), vector-based formats (e.g., SVG) or computer instructions for drawing graphics. Moreover, the data 428 may comprise information sufficient to identify the relevant information, such as numbers, descriptive text, proprietary codes, pointers, references to data stored in other memories (including other network locations) or information that is used by a function to calculate the relevant data. In this example, the data 428 includes database 427 for storing location information 429 relevant to a number of different locations.

Database 427 may store the location information 429 in association with other information, such as images, semantic features, location descriptions, etc. In this regard, as information such as an image is received from the client device 410, location information such as geographic coordinates, map information, or the name of a business, city, or the like may be returned. While the database 427 is shown within the server 420 in FIG. 4, it should be understood that the server may additionally or alternatively be located remotely from the server 420. For example, the server 420 may access multiple databases in various locations. In some examples, the different databases may be store different types of information.

The server 420 may be at one node of network 395 and capable of directly and indirectly communicating with other nodes of the network 395. For example, the server 420 may include a web server that may be capable of communicating with client devices 101 and 410 via network 395 such that it uses the network 395 to transmit and display information to a user on a display 413 of the client device 410. Server 420 may also include a plurality of computers, e.g., a load balanced server farm, that exchange information with different nodes of a network for the purpose of receiving, processing and transmitting data to client devices 101 and 410. In this instance, the client devices 101 and 410 will typically still be at different nodes of the network 395 than the computers comprising server 420.

Network 395, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 101 and 410 over network 395.

Each client device 101 and 410 may be configured similarly to the server 420, with one or more processors 412, memory 414, instructions 416, data 418 and all of the internal components normally found in a personal computer. By way of example only, the client device 410 may include a central processing unit (CPU), display device 413 (for example, a monitor having a screen, a projector, a touch-screen, a small LCD screen, a television, or another device such as an electrical device that is operable to display information processed by the processors 412), CD ROM, 1 hard drive, user input devices, such as a keyboard, mouse, touch screen or microphone, speakers, modem and/or network interface device (telephone, cable or otherwise) and all of the components used for connecting these elements to one another.

Client device 410 may be a computing device. For example, client device 410 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 410, the client device 410 may be implemented as multiple devices with both portable and non-portable components (e.g., software executing on a rack-mounted server with an interface for gathering location information).

Although the client device 410 may include a full-sized personal computer, the subject matter of the present disclosure may also be used in connection with mobile devices capable of wirelessly exchanging data. For example, client device 410 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers.

Sensors 415 may include one or more of a variety of sensors. For example, thermometers, barometers, motion detectors, heat sensors, lasers, light sensors, radiation sensors, microphones, etc. may be used alone or in combination to detect various objects, information, or activities. As one example, a motion detector may detect motion at a particular rate and/or direction which suggests people walking by. A relatively (for the candidate geography) low level of humidity and temperature may also be detected (possibly implying the use of air conditioning), and music and/or crowd noise at a particular decibel level may be detected by the microphone. In combination, such information may indicate that the client device 410 is at an indoor shopping mall.

Image capture module 417 may be a camera, camcorder, or any other device capable of capturing still or motion pictures.

Geographic positioning component 419 may be used to determine the geographic location of the device 410. For example, the position component may include a GPS receiver to determine the device's latitude, longitude and/or altitude position. Other location systems such as laser-based localization systems, inertial-aided GPS, or camera-based localization may also be used to identify the location of the device 410. The location of the device 410 may include an absolute geographical location, such as latitude, longitude, and altitude as well as relative location information, such as location relative to other client devices or other objects.

Instructions 416 and 426 of the client device 410 and server 420 respectively may be a set of instructions to be executed directly (such as machine code) or indirectly (such as scripts) by the processor. In that regard, the terms "instructions," "steps" and "programs" may be used interchangeably herein. The instructions 416 and 426 may be stored in object code format for direct processing by the processor, or in another computer language including scripts or collections of independent source code modules that are interpreted on demand or compiled in advance. Functions, methods and routines of the instructions are explained in more detail below.

In order to facilitate operations of system 400 for detecting the location of a mobile device, such as client devices 101 and 410, the server 420 may further include a feature indicator detector 423 for identifying location features associated with an image and a location detector for comparing those identified indicators with the semantic features of various locations stored in database 427. The functionally of these modules can exist in a fewer or greater number of modules than what is shown, with such modules residing at one or more computing devices, which may be geographically dispersed. The modules may be operable in conjunction with the client devices 101 and 410 from which it may receive images captured at locations as well as other semantic information regarding those images. Thereupon, the images and other semantic information may be used to ascertain the location of client devices 101 and 410.

Figure 5:
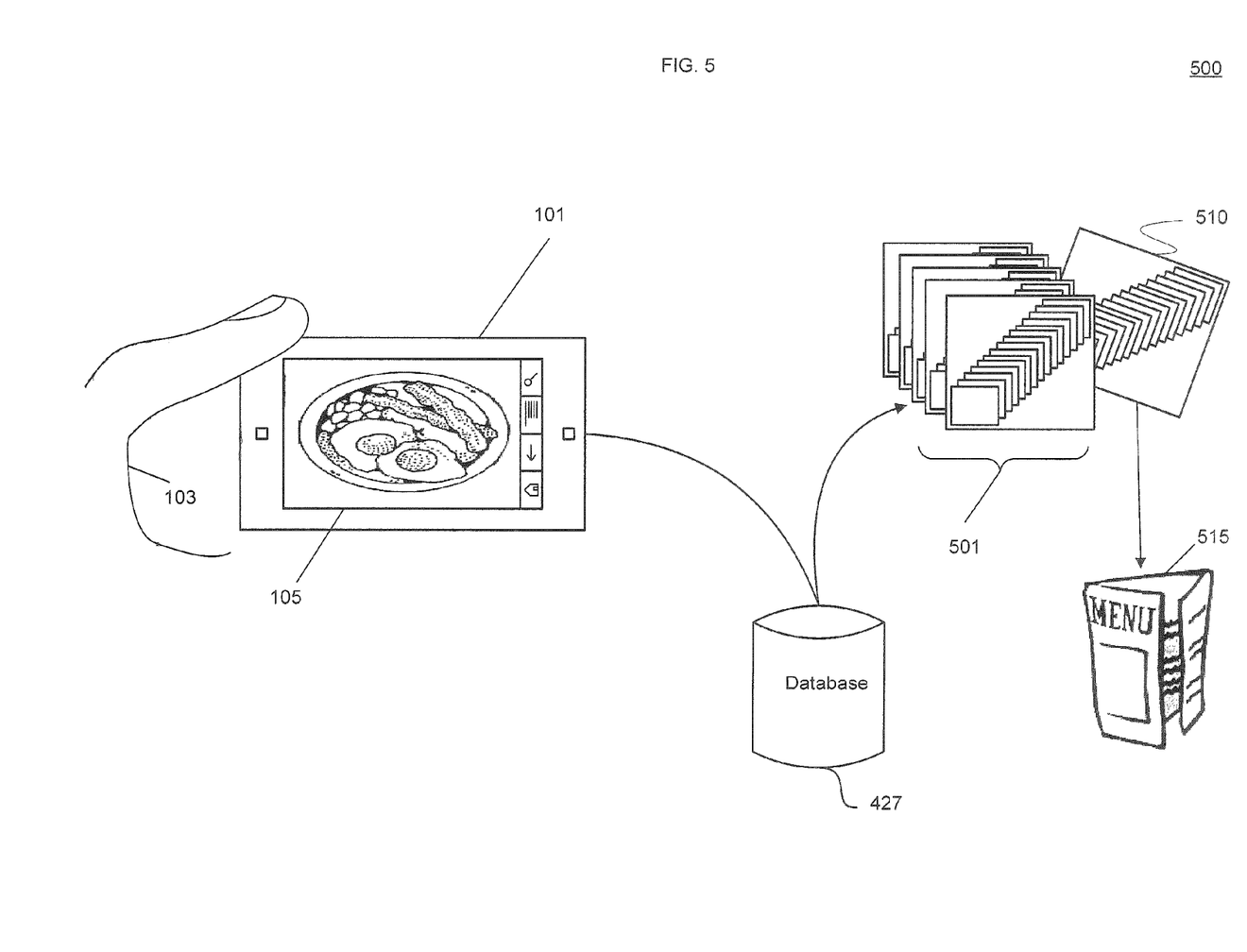
FIG. 5 is an example of semantic indicators in accordance with aspects of the disclosure.

FIG. 5 is an example of semantic indicators 500. In this example, device 101 may capture an image 105 of food at a restaurant. The system may detect the type of food in the photo in order to determine that the user device is at a particular type of restaurant in the area which serves this type of food. For example, the system may compare the captured image 105 with stored images 501 in database 427. For example, the stored food images 501 may be retrieved from different food menus 515 for various restaurants, or may have been uploaded by restaurant owners or patrons. The stored images 501 may each be associated with a particular restaurant, type of restaurant, menu, or the like. The stored images 501 may be categorized in any way, such as by type of food, restaurant, etc. In addition to comparing the image 105 and the image 501, the system may compare feature indicators, such as sounds, colors, etc., received from the computing device 101 with stored feature indicators associated with particular restaurants. A match to a particular location may be determined when at least one of a number of objects in the image 105 and a number of detected features received from the device 101 match objects in stored images or stored features to a predetermined threshold level. For example, stored image 510 may be a closest match to the image 105, and the location associated with the stored image 510 may therefore be determined to be the location of the device 101. Such matching may enable a user device to, for example, "check-in" to a social networking site by using a food image taken at a restaurant.

Figure 6:
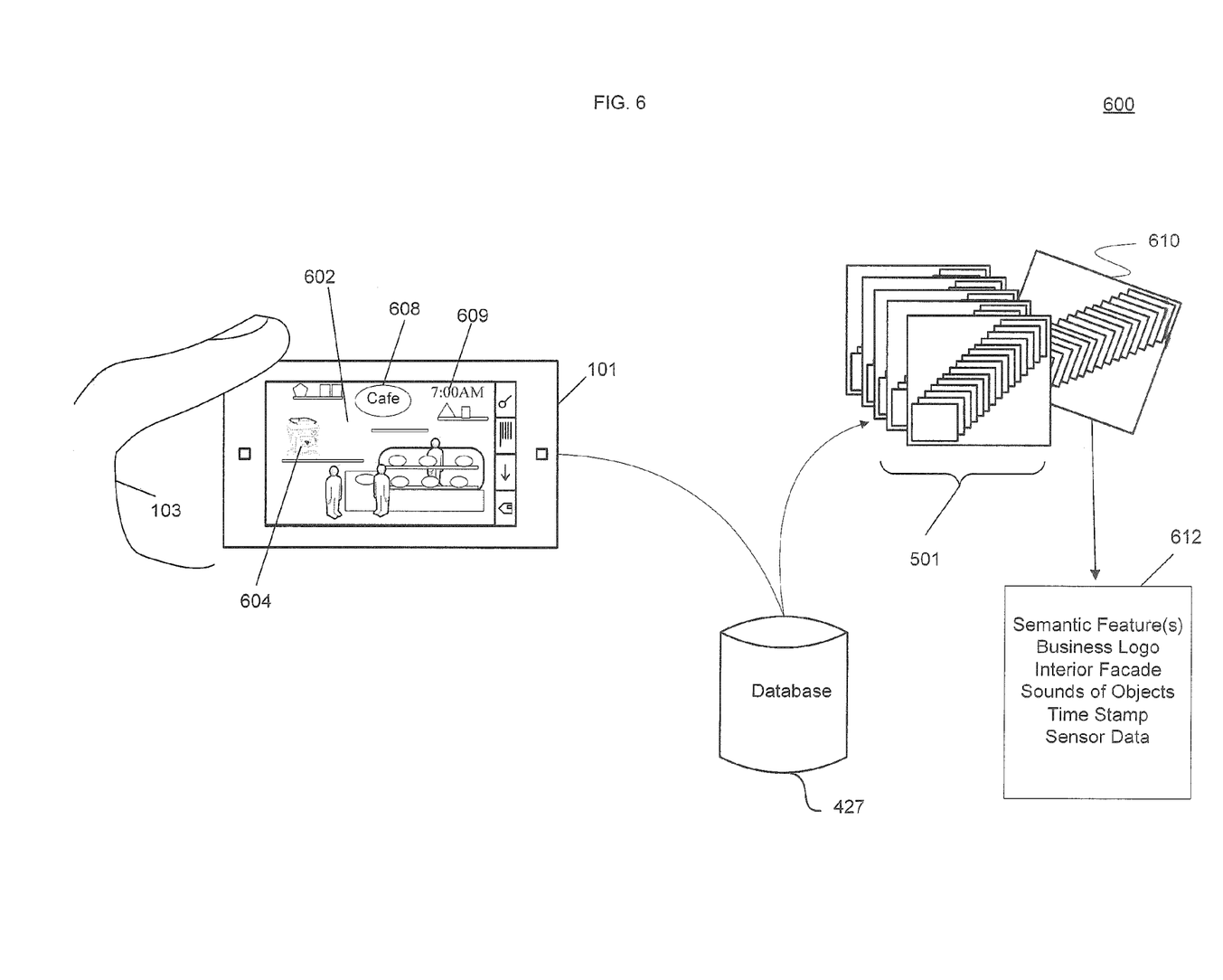
FIG. 6 is another example of semantic indicators in accordance with aspects of the disclosure.

FIG. 6 is another example of semantic indicators 600. In this example, the user device 101 may capture a video 602 inside of a location. Based on the detected feature indicators related to the type of sounds of various objects in the video, such the sound of an espresso machine 604 or loud music, the system may estimate that the device 101 is in a particular café. Objects in the video 602, such as a logo 608, tables, décor, etc., may also be analyzed against images 501 and other semantic features 612 in the database 427. In some embodiments, a timestamp 609 may be captured indicating a time when the video was taken. Based on this additional semantic information, the system select a match 610 and determine based on the selected match 610 that the device is at a particular café open at that time.

Figure 7:
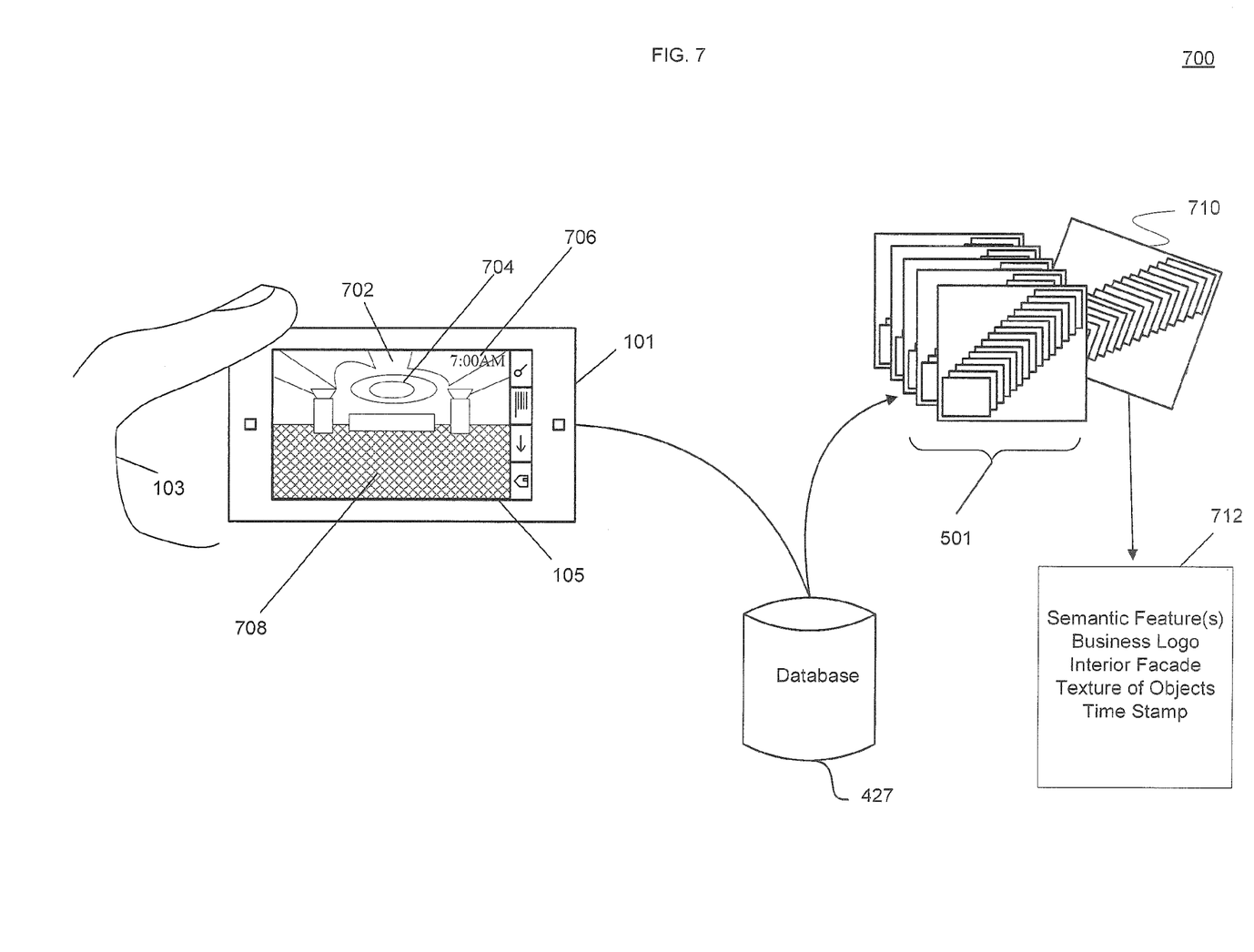
FIG. 7 is yet another example of semantic indicators in accordance with aspects of the disclosure.

FIG. 7 is yet another example of semantic indicators 700. In this example, the system may detect other kinds of feature indicators to determine the location of the user device 101, such as textures of objects in the images, colors, patterns, architecture, or the like. For example, the captured image 105 may include a carpet 708 having a particular texture, pattern, and/or color which may be relatively distinctive. Walls 702 in the image 105 may also have a particular color or pattern, and in some instances may include décor 704 which is also distinctive. For example, detected décor in mainly a particular color or combination of colors may indicate a particular business or school/university or other type of organization associated with a specific location. As in the example above, a timestamp 706 may also be used to match against stored feature indicators 712 associated with establishments open during certain hours. Still further, many other types of feature indicators, such as motion detection indicators (e.g., to detect people walking by or some other type of movement) barometric, humidity and radiation indicators, etc., that were captured along with the images (for example, by sensors associated with the mobile device) can be matched against the stored feature indicators 712 to identify a particular data set 710 and further narrow down the position of the user device.

To better aid in understanding an example of some of the aspects described above, reference is now made to FIG. 8, which is a flow diagram 800. As previously discussed, the following operations do not have to be performed in the precise order described below. Rather, as mentioned above, various operations can be handled in a different order or simultaneously, and operations may be added or omitted.

Figure 8:
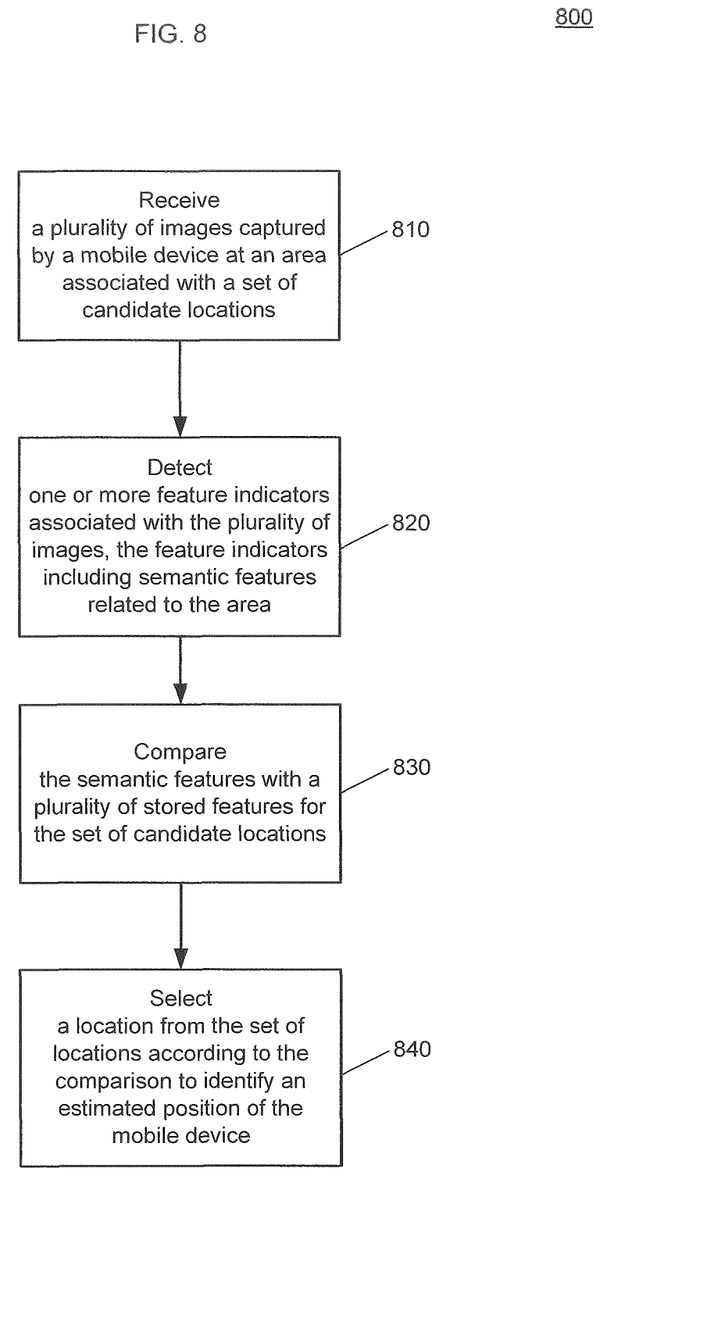
FIG. 8 is a flow diagram depicting an example of a method in accordance with aspects of the disclosure.

In block 810, one or more images captured by a mobile device at an area associated with a set of candidate locations may be received. For example, a mobile device may be within range of a number of different businesses, landmarks, or other locations. The mobile device may capture images of or within a particular location send the images to a server or database, for example, by uploading the images to a website.

In block 820, one or more feature indicators associated with the plurality of images may be detected. These feature indicators may include semantic features related to the area. For example, indicators such as objects, colors, textures, or architecture may be detected from the images. In an example where the captured images are video images, the feature indicators may further include sounds, motions, variations in brightness, etc. In some examples, feature indicators captured by other sensors may be detected. For example, indicia such as humidity, temperature, time, radiation, etc. may be captured by one or more sensors coupled to the device 101 and sent to the server or database.

In block 830, the semantic features may be compared with a plurality of stored features for the set of candidate locations. For example, an image received by the mobile device may be compared with stored images. Elements within the images, such as objects, colors, and textures, may be analyzed in performing the comparison. Additionally, other features, such as sound, temperature, motion, etc., received from the mobile device may be compared with stored features associated with particular locations. In one example, scores may be calculated for possible locations based on the comparison. A location with a higher number of features matching the features received by the mobile device may be assigned a higher score. In some examples, the scores may be weighted based on the matching features. For example, a matching object in an image may receive more points than a matching sound.

In block 840, a location from the set of locations may be selected according to the comparison. The selected location may identify an estimated position of the mobile device. For example, a best match to the received images and feature indicators may be determined based on the comparison. The location associated with the best match may be identified as the estimated position of the mobile device. The best match may be selected based on a highest score or any other convention.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The invention claimed is:

1. A computer implemented method, comprising:
receiving, using one or more processors, a plurality of images captured by a mobile device at an area, the area being associated with a set of candidate locations;
detecting, using the one or more processors, a first type of feature indicator and a second type of feature indicator associated with the plurality of images, the first type of feature indicator being different than the second type of feature indicator, the first and the second types of feature indicators including types of semantic features related to interior portions of the area, the types of semantic features for the first type of feature indicator including at least one of: 1) surface textures of interior objects, 2) patterns of interior elements, 3) interior architecture, or 4) interior décor and the types of semantic features for the second type of feature indicator including at least one of: 1) interior noise or 2) interior music;
identifying, using the one or more processors, a set of feature indicators including a combination of the first type of feature indicator and the second type of feature indicator;
comparing, using the one or more processors, the set of feature indicators with a plurality of stored location feature sets;
calculating a score for one or more of the set of candidate locations based on at least a number of matching semantic features, wherein the score is weighted based on the type of semantic feature used in the comparison, such that the types of semantic features for the first type of feature indicator is weighted differently than the types of semantic features for the second type of feature indicator;
selecting, using the one or more processors, a location from the set of candidate locations based at least in part on the comparison; and
estimating, using the one or more processors, a position of the mobile device based at least in part on the selected location.

2. The method of claim 1, further comprising comparing position information associated with the mobile device with position information associated with the plurality of stored location feature sets for the set of candidate locations.

3. The method of claim 1, wherein the comparing further comprises determining whether the set of feature indicators correspond to stored location feature sets for a given location in the set of candidate locations.

4. The method of claim 1, wherein the interior décor includes a particular color combination.

5. The method of claim 1, wherein the estimated position indicates a type of organization associated with the selected location.

6. The method of claim 1, wherein the semantic features further include a time of day and the selected location is associated with a business open at that time of day.

7. The method of claim 1, wherein the estimated position indicates at least one of a particular business, school, or university associated with the selected location.

8. The method of claim 1, wherein the semantic features include sensor data associated with the plurality of images and the sensor data is captured by the mobile device.

9. The method of claim 1, wherein the semantic features include at least one of visual features of a food image and audio features of a machine in operation.

10. A non-transitory computer readable medium storing instructions that, when executed by one or more processors, cause the one or more processors to perform a method, the method comprising:
receiving a plurality of images captured by a mobile device at an area, the area being associated with a set of candidate locations;
detecting a first type of feature indicator and a second type of feature indicator associated with the plurality of images, the first type of feature indicator being different than the second type of feature indicator, the first and the second types of feature indicators including types of semantic features related to interior portions of the area, the semantic features for the first type of feature indicator including at least one of: 1) surface textures of interior objects, 2) patterns of interior elements, 3) interior architecture, or 4) interior décor and the types of semantic features for the second type of feature indicator including at least one of: 1) interior noise or 2) interior music;
identifying a set of feature indicators including a combination of the first type of feature indicator and the second type of feature indicator;
comparing the set of feature indicators with a plurality of stored location feature sets for the set of candidate locations;
calculating a score for one or more of the set of candidate locations based on at least a number of matching semantic features, wherein the score is weighted based on the type of semantic feature used in the comparison, such that the types of semantic features for the first type of feature indicator is weighted differently than the types of semantic features for the second type of feature indicator;
selecting a location from the set of candidate locations based at least in part on the comparison; and
estimating a position of the mobile device based at least in part on the selected location.

11. The non-transitory computer readable medium of claim 10, the method further comprising comparing position information associated with the mobile device with position information associated with the plurality of stored location feature set for the set of candidate locations.

12. A system comprising:
a memory storing a plurality of location features for a set of candidate locations; and
one or more processors in communication with the memory, the one or more processors being configured to:
receive a plurality of images captured by a mobile device at an area, the area being associated with a set of candidate locations;
detect a first type of feature indicator and a second type of feature indicator associated with the plurality of images, the first type of feature indicator being different than the second type of feature indicator, the first and the second types of feature indicators including types of semantic features related to interior portions of the area, the types of semantic features for the first type of feature indicator including at least one of: 1) surface textures of interior objects, 2) patterns of interior elements, 3) interior architecture, or 4) interior décor and the types of semantic features for the second type of feature indicator including at least one of: 1) interior noise or 2) interior music;

identify a set of feature indicators including a combination of the first type of feature indicator and the second type of feature indicator;

compare the set of feature indicators with a plurality of location feature sets stored in the memory;

calculate a score for one or more of the set of candidate locations based on at least a number of matching semantic features, wherein the score is weighted based on the type of semantic feature used in the comparison, such that the types of semantic features for the first type of feature indicator is weighted differently than the types of semantic features for the second type of feature indicator;

select a location from the set of candidate locations based at least in part on the comparison; and estimate a position of the mobile device based at least in part on the selected location.

13. The system of claim 12, wherein the one or more processors are further configured to compare position information associated with the mobile device with position information associated with the plurality of stored location feature sets for the set of candidate locations.

14. The system of claim 12, wherein the compare further comprises determining whether the set of feature indicators correspond to stored location feature sets for a given location in the set of candidate locations.

15. The system of claim 12, wherein the interior décor includes a particular color combination.

16. The system of claim 12, wherein the estimated position indicates a type of organization associated with the selected location.

17. The system of claim 12, wherein the semantic features include a time of day and the selected location is associated with a business open at that time of day.

18. The system of claim 12, wherein the estimated position indicates at least one of a particular business, school, or university associated with the selected location.

19. The system of claim 12, wherein the semantic features include at least one of motion, barometric, humidity or radiation indicators.

20. The system of claim 12, wherein the semantic features include at least one of visual features of a food image and audio features of a machine in operation.

* * * * *